(12) United States Patent
Wang et al.

(10) Patent No.: US 7,827,610 B2
(45) Date of Patent: *Nov. 2, 2010

(54) WIRELESS LAN INTRUSION DETECTION BASED ON LOCATION

(75) Inventors: Huayan Amy Wang, Hauppague, NY (US); Dave Goren, Smithtown, NY (US); Jacob Sharony, Dix Hills, NY (US); Bruce Willins, East Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 12/056,693

(22) Filed: Mar. 27, 2008

(65) Prior Publication Data

US 2008/0201377 A1    Aug. 21, 2008

Related U.S. Application Data

(63) Continuation of application No. 10/744,026, filed on Dec. 22, 2003, now Pat. No. 7,426,383.

(51) Int. Cl.
*G08B 23/00* (2006.01)

(52) U.S. Cl. .................. 726/23; 380/250; 380/247; 455/411

(58) Field of Classification Search .............. None
See application file for complete search history.

(56) References Cited

U.S. PATENT DOCUMENTS 7,002,943 B2 *   2/2006   Bhagwat et al. ............. 370/338
2003/0195814 A1 * 10/2003   Striemer ...................... 705/26

* cited by examiner

*Primary Examiner*—Pramila Parthasarathy

(57) ABSTRACT

A intrusion detection method is disclosed for use in a wireless local area data communications system, wherein mobile units communicate with access points, and wherein the system is arranged to locate transmitters using signals transmitted by the transmitters. A database relating authorized transmitters to location is maintained. Selected signals are detected at the access points and location data corresponding to the selected signals for use in locating a source of the signals is recorded. The source location is determined using the location data, and the source location is compared to a corresponding location in the database. An alarm is signaled if the source location is inconsistent with the corresponding database location.

20 Claims, 1 Drawing Sheet

WIRELESS LAN INTRUSION DETECTION BASED ON LOCATION

PRIORITY CLAIM

This application is a Continuation application of U.S. patent application Ser. No. 10/744,026 filed on Dec. 22, 2003 now U.S. Pat. No. 7,426,383, entitled "Wireless LAN Intrusion Detection Based on Location". The entire disclosure of the prior application is considered as being part of the disclosure of the accompanying application and hereby expressly incorporated by reference herein.

BACKGROUND OF INVENTION

The present invention relates to wireless local area networks, and particular to such networks as include arrangements for locating mobile units based on signals transmitted by the mobile units. In particular the invention relates to methods for detecting unauthorized access or attempted access to the wireless local area network.

The use of mobile data communications systems to perform location functions for locating mobile units is described in articles entitled Enhancements to the User Location and Tracking System, by Paramvir Bahl and Venkata N. Padmanabhan, and User Location and Tracking in an In-Building Radio Network, Microsoft Technical Report MSR-TR-99-12, dated February 1999, by the same authors, both published by Microsoft Research. As described therein signal strength of signals of the wireless data communications system, such as a system using the protocol of IEEE Standard 802.11, are used for locating mobile units within an area serviced by the system. Other techniques for locating mobile units using the wireless data communications systems or other location system are possible.

In co-pending application Ser. No. 09/528,697, filed Mar. 17, 2000, which is owned by the assignee of the present application and incorporated herein by reference, there is described a system which follows the protocol of IEEE Standard 802.11, but which uses a combination of RF Ports (also called "access ports") and Cell Controllers to perform the functions of Access Points of a classical 802.11 data communications system. Lower level MAC functions are performed by the RF Ports and higher level MAC functions, including association and roaming functions, are performed by the cell controller. The term "access point" as used herein is intended to include conventional access points, such as those which follow the protocol of IEEE Standard 802.11 and perform all MAC functions, as well as RF Ports operating with cell controllers, as described in the incorporated co-pending application.

It is an object of the present invention to provide a method for detecting unauthorized access or attempted access to such systems based on the location of a transmitter sending selected signals, which may be part of an attempt for unauthorized access.

SUMMARY OF THE INVENTION

In accordance with the invention there is provided a method for use in a wireless local area data communications system, wherein mobile units communicate with access points, and wherein the system is arranged to locate transmitters using signals transmitted by the transmitters. A database relating authorized transmitters to location is maintained. Selected signals are detected at the access points and location data corresponding to the selected signals for use in locating a source of the signals is recorded. The source is located using the location data, and the source location is compared to a corresponding location in the database. An alarm is signaled if the source location is inconsistent with the corresponding database location.

The selected signal may be a signal transmitted by a mobile unit and the source location is compared to a location for the mobile unit in the database. The selected signal may be an association request signal. Where the selected signal is a signal type transmitted by an access point, the source location is compared to a location for the access point. The selected signal may be a management/control signal, a beacon signal, a disassociation or a de-authentication signal.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
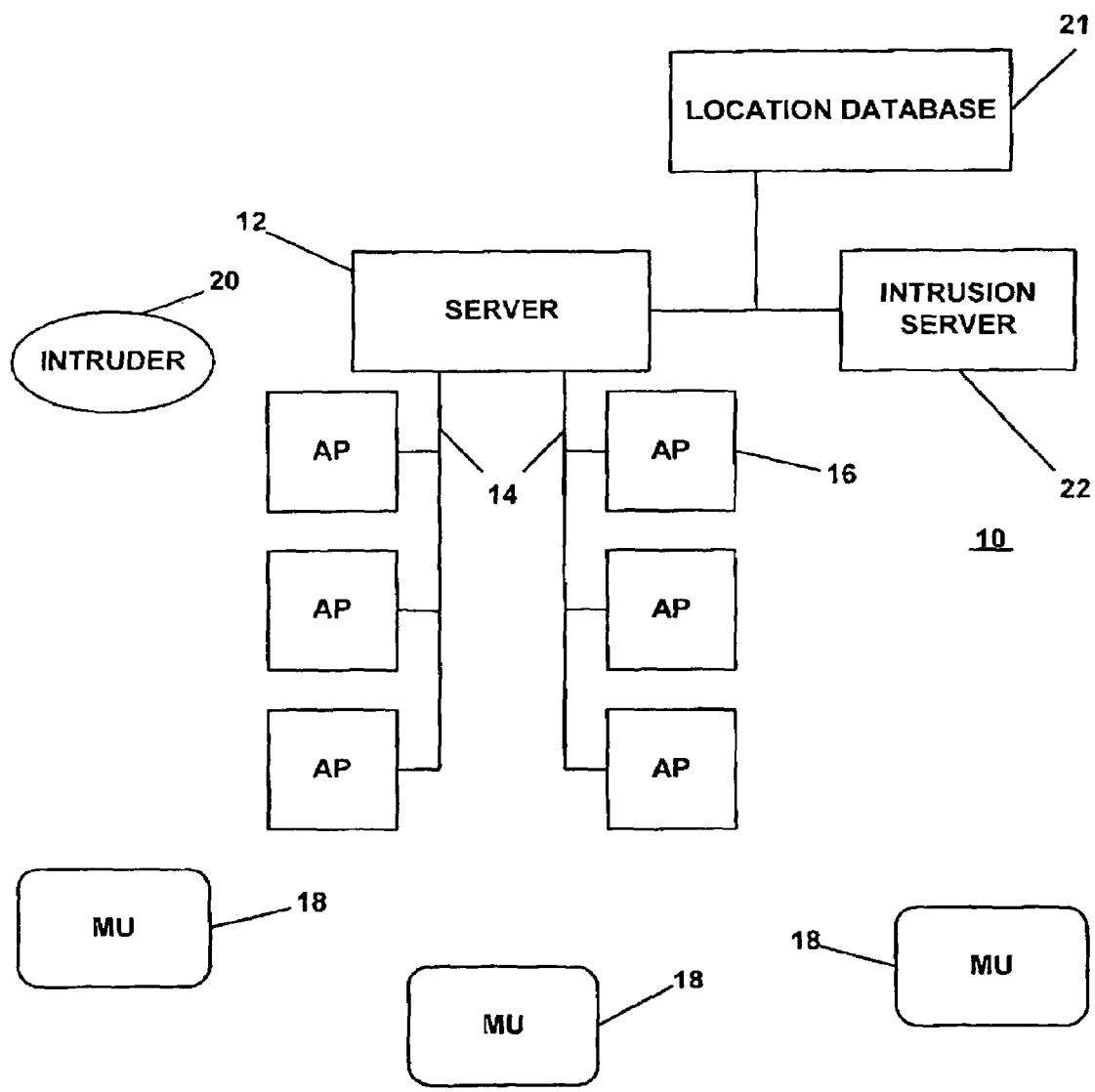
FIG. 1 is a block diagram illustrating a wireless local area network in which the method of the present invention may be practiced.

Referring to FIG. 1 there is shown a wireless local area network 10 having a server 12 connected over a wired network 14 to a plurality of access points 16. Network 10 may operate according to a standard protocol, such as IEEE Standard 802.11 to provide wireless network data communications between mobile units 18 and server 12. Mobile units 18 may be any IEEE 802.11 wireless station, and need not necessarily be movable or portable for purposes of the present invention. In addition, as described in the referenced Microsoft articles, System 10 additionally includes provisions for determining the location of mobile units, for example by their signal strength or other techniques, such as time of arrival. The method of the present invention may be carried out in server 12, or may be carried out in a dedicated intrusion server 22.

Server 10 has the capability to determine location of signal sources using signal characteristic data captured by access points 16 and provided as data to server 12 in association with received packets. Server 12 determines the location of the mobile unit that sent the packet using the signal characteristic data and stores the location in a database 21. While location determination functions usually are implemented to determine the location of mobile units 18, the location of which may change, there is no reason the signals from access points 16 cannot be received by other access points and provided with signal characteristics to server 12 for purposes of assuring that signals usually sent by an access point are in fact being sent by an access point and not being sent by an intruder device 20 which is seeking access to the system 10. Similarly, in another embodiment of a system according to the present invention, trusted mobile units or wireless stations of a type similar to mobile units 18 may be used to ascertain the location of access points.

In one intrusion scenario an intruder 20, known as the man-in-the-middle observes data communications between an access point 16 and an associated mobile unit 18. The intruder 20 thereafter replicates signals between the access point and the mobile unit 18, first sending a disassociation or de-authorization signal to the mobile unit 18, replicating the access point 16, and thereafter replicating the mobile unit 18 to communicate with the access point 16. This attack is facilitated by the fact that network management/control signals are not encrypted.

In accordance with the invention, selected signals received by access points 16 are subjected to location determination to determine if the signal originated from an authorized user of the system. Signals selected for this location determination would include, for example network management signals, including signals usually sent by an access point 16 such as beacon signals.

Some signals that may be subjected to location determination are authorization or association requests sent from a mobile unit 18. The location of origin for such signals can be compared to the last recorded location for the mobile unit 18 in the location database 21. If the mobile unit 18 is determined to be at a location that is an unlikely distance from its last determined location, as recorded in the database, an exception can be signaled to the system operator alerting the operator to a possible intrusion.

With respect to signals usually originated by access points 16, such as management/control signals, including beacon signals, de-authorization signals and disassociation signals, the other access points 16 in the system can record and pass the signal characteristic data to the server 12 so that the location of the signal source can be determined and compared to a known location for the access point identified in the signal. If the determined location is inconsistent with the known location, there may be an intrusion attempt, and an alert can be issued.

In another intrusion scenario, an intruder 20 may utilize spoofed EAPoL (Extensible Authentication Protocol, sent over IEEE 802 LANs) signals. These signals may include EAPoL-Start, EAPoL-Accept, EAPoL-Reject, and other EAPoL packets which may be used in authentication. In a similar manner as described above, a server 22 according to the present invention may compare the location of intruder 20 to authorized mobile units to a corresponding location in the database. An alarm can then is signaled if the intruder EAPoL signal source location is inconsistent with the corresponding database location.

In a different type of intrusion scenario, an intruder 20 may use spoofed MAC addresses. In one scenario, an intruder may utilize the same MAC address from different spatial locations. A system according to the present invention may be configured to read location information to determine the source, and may additionally extract the source MAC address. If a signal originates from a MAC address which is not new, but which is at a substantially different location from the most recent location of the same MAC address, it may be deduced that the intruder 20 is spoofing a legitimate MAC address, possibly to hijack a session. If such a situation is detected by comparing the location information and MAC addresses, the appropriate alarm may be generated. Likewise, an intruder 20 may use constantly changing MAC addresses from the same source. This scenario can be detected in a similar manner as that described above, by extracting the MAC address from the transmitted signal source, and then comparing the location information with other recent transmission locations. If a location is a substantial match to a location of recent transmission, but with a different MAC address, an alarm may be signaled.

Another exemplary embodiment of a system and method according to the present invention may be used to detect other intrusion scenarios. For example, an intruder 20 may utilize a directional antenna to evade real-time location-based security measures, such as those described above. In an exemplary scenario, a directional antenna utilized by intruder 20 might cause a signal to be received by only one or a limited number of access points 20, such that the location of intruder 20 may not be accurately determined. In an embodiment of the present invention, where such a situation is detected—i.e., a signal is received only by a limited number of access points located in a given vicinity—the signal may be flagged as suspicious. This determination may be made based on various data or the meeting of a given threshold, possibly after a predetermined number of transmissions from the source location, or if a certain number of receivers in the vicinity fail to receive the signal, etc. In any event, once flagged, the appropriate alarm may be triggered.

The present invention may also be used to identify network intruders based on source location of signal transmission. For example, in a secure facility, a database may be kept which includes information about the layout of the facility. This information may include, e.g., locations of outer boundaries of the facility. In the event that an intruder 20 attempts to access the network from outside a predetermined allowable boundary, e.g., the walls of the secure facility, an alarm may be signaled.

Similarly, location of the signal source may be used to identify suspicious transmission locations, e.g., from an area in the facility which is the interior of a wall or structure, or some other location from which it would be impossible for a mobile unit 18 to transmit. The detection of such conditions might be the result of unauthorized tampering and could suggest a possible intruder scenario. Likewise, location data for a moving mobile unit 18 may be recorded and analyzed to track suspicious movements, e.g., through a path which is otherwise obstructed by walls or other structures. Further still, a mobile unit 18 may be configured to move only along a predetermined, authorized path. An alarm may be signaled where mobile unit 18 deviates from such authorized path. Any of these described methods may be used to identify possible intruders within the scope of the present invention.

In another exemplary embodiment of the present invention, another criteria for detection of network intruders may be network traffic. The present invention may be used to monitor traffic conditions at particular times and/or locations, and any abnormal activity may be flagged. This abnormal activity may include higher than normal network traffic from a particular location, lower than normal network traffic, commands sent from unusual locations, or applications being executed by a mobile unit 18 from a particular location and which is not normally executed from that location.

In another exemplary embodiment of a system and method according to the present invention, additional dedicated locating devices may be added, in addition to or in lieu of access points 14, to increase the density of receivers for locating source signals, thus improving accuracy of the determined location. These devices may be 802.11 receiver-only devices, or some other type of device capable of receiving the transmitted source signals. The improved accuracy which such an arrangement could provide may be especially critical in certain intrusion detection scenarios—for example, to correctly detect signals transmitted from near the boundary of a predefined allowed mobile unit area (e.g., near a wall dividing the inside/outside of a secure mobile facility).

While the foregoing described exemplary embodiments may preferably be configured such that access points perform the required location detection functions (infrastructure-based), the present invention is not limited to such configurations. Other configurations, e,g, wherein a trusted mobile unit or other wireless station performs location detection functions (mobile-based), are also within the scope of the present invention.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

We claim:

1. A method for determining a presence of an intruder device within a coverage area of a wireless communication network, comprising:
    maintaining a database relating authorized sources to location;
    receiving a signal from a source;
    determining a location of the source based on a characteristic of the signal;
    comparing said source location to a corresponding location in the database;
    wherein if the determined location fails to correspond to an authorized location for the source, designating the source as the intruder device; and
    signaling an alarm if the source is designated as an intruder device.

2. The method as recited in claim 1, wherein the source is a mobile communication device, and the determining of the location includes determining whether the mobile communication device is within an expected distance from a previously determined location.

3. The method as recited in claim 1, wherein the source is an access point at a fixed location.

4. The method as recited in claim 3, wherein the signal is a beacon signal.

5. The method as recited in claim 3, wherein the signal is one of a de-authorization and a de-authentication signal.

6. The method as recited in claim 3, wherein said signal is a disassociation signal.

7. The method as recited in claim 1, wherein the signal is an association request signal.

8. The method as recited in claim 1, wherein the signal is an Extensible Authentication Protocol over LAN ("EAPoL") signal.

9. The method as recited in claim 1, wherein additional locating devices are used to detect the signal to improve an accuracy of the locating of the source.

10. The method as recited in claim 1, wherein the signal is a management/control signal.

11. A system for determining a presence of an intruder device within a coverage area of a wireless communication network, comprising:
    means for maintaining a database relating authorized sources to location;
    means for receiving a signal from a source;
    means for determining a location of the source based on a characteristic of the signal;
    means for comparing said source location to a corresponding location in said database;
    means for, if the determined location fails to correspond to an authorized location for the source, designating the source as the intruder device; and
    means for signaling an alarm if the source is designated as an intruder device.

12. The system as recited in claim 11, wherein the source is a mobile communication device, and the means for determining includes means for determining whether the mobile communication device is within an expected distance from a previously determined location.

13. The system as recited in claim 11, wherein the source is an access point at a fixed location.

14. The system as recited in claim 13, wherein the signal is a beacon signal.

15. The system as recited in claim 13, wherein the signal is one of a de-authorization and a de-authentication signal.

16. The system as recited in claim 13, wherein the signal is a disassociation signal.

17. The system as recited in claim 11, wherein the signal is an association request signal.

18. The system as recited in claim 11, wherein the signal is an Extensible Authentication Protocol over LAN ("EAPoL") signal.

19. The system as recited in claim 11, wherein additional locating devices are used to detect the signal to improve an accuracy of the locating of the source.

20. The system as recited in claim 13, wherein the signal is a management/control signal.

* * * * *

UNITED STATES PATENT AND TRADEMARK OFFICE
CERTIFICATE OF CORRECTION

PATENT NO.         : 7,827,610 B2                                        Page 1 of 1
APPLICATION NO.    : 12/056693
DATED              : November 2, 2010
INVENTOR(S)        : Wang et al.

It is certified that error appears in the above-identified patent and that said Letters Patent is hereby corrected as shown below:

Column 1, Line 14, delete "OF" and insert -- OF THE --, therefor.

Column 6, Line 41, in Claim 20, delete "claim 13," and insert -- claim 11, --, therefor.

Signed and Sealed this
Eighth Day of November, 2011

David J. Kappos
*Director of the United States Patent and Trademark Office*